United States Patent [19]

Heathe et al.

[11] Patent Number: 4,988,281
[45] Date of Patent: Jan. 29, 1991

[54] VALVE ASSEMBLY FOR INJECTION MOLDING MACHINE

[75] Inventors: William R. Heathe, Mississauga, Canada; Hartmut Roetzel, Rameldange, Fed. Rep. of Germany

[73] Assignee: Husky Injection Molding Systems Ltd., Bolton, Canada

[21] Appl. No.: 404,212

[22] Filed: Sep. 7, 1989

[51] Int. Cl.⁵ ............................................. B29C 45/60
[52] U.S. Cl. ...................................... 425/559; 366/77
[58] Field of Search ................ 425/462, 465, 562–564, 425/559; 366/77

[56] References Cited

U.S. PATENT DOCUMENTS

| | | | |
|---|---|---|---|
| 3,099,861 | 8/1963 | Gaspar et al. | 425/465 |
| 3,335,461 | 8/1967 | Schwartz | 425/562 |
| 3,374,502 | 3/1968 | Lazzara | 425/562 |
| 3,945,784 | 3/1976 | Collins | 425/562 |
| 4,477,242 | 10/1984 | Eichlseder | 425/564 |
| 4,530,605 | 7/1985 | Eichlseder et al. | 425/564 |

FOREIGN PATENT DOCUMENTS 2719497 11/1978 Fed. Rep. of Germany ...... 425/462

Primary Examiner—Willard E. Hoag
Attorney, Agent, or Firm—Bachman & LaPointe

[57] ABSTRACT

The improved check valve assembly includes a cylindrical barrel, a rotating and reciprocating plasticizing feed screw in said barrel, a screw tip or head portion downstream of the feed screw and connected thereto with the feed screw feeding heated thermoplastic material to the screw tip which in turn feeds the material externally of the screw tip, a check valve assembly between the feed screw and the screw tip including a sliding ring inside the barrel, a first sealing surface of the ring sealable against the feed screw operative to block communication between the feed screw and screw tip, and means operative to seal the ring against the feed screw upon rotation of the feed screw.

9 Claims, 3 Drawing Sheets

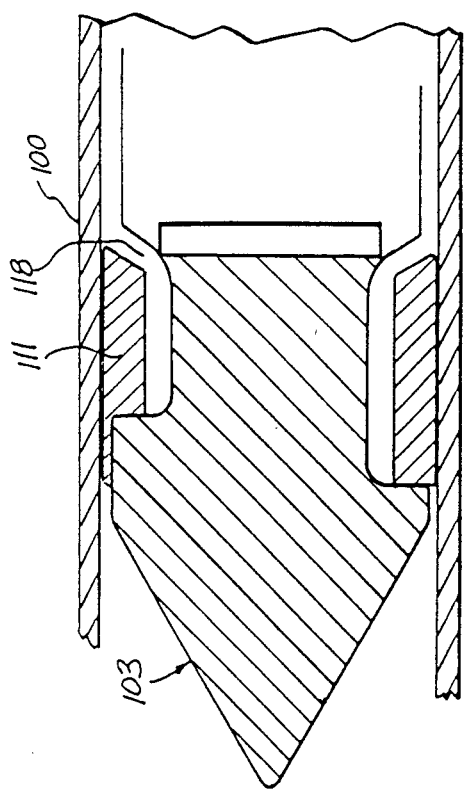
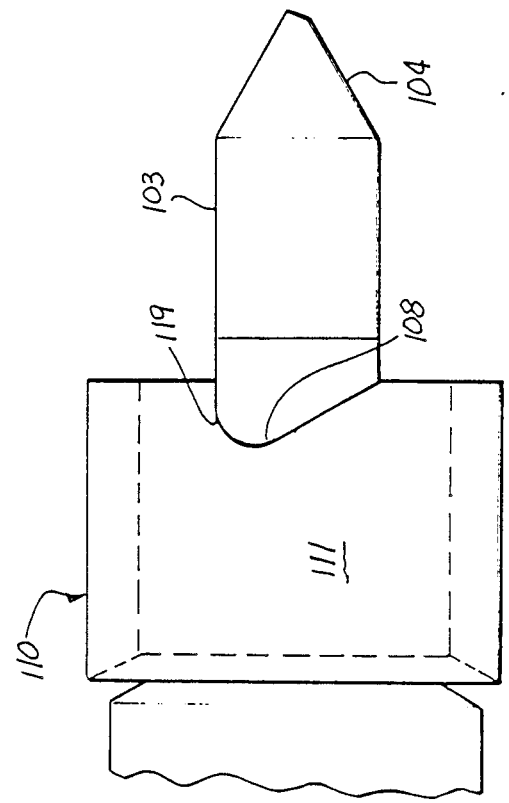
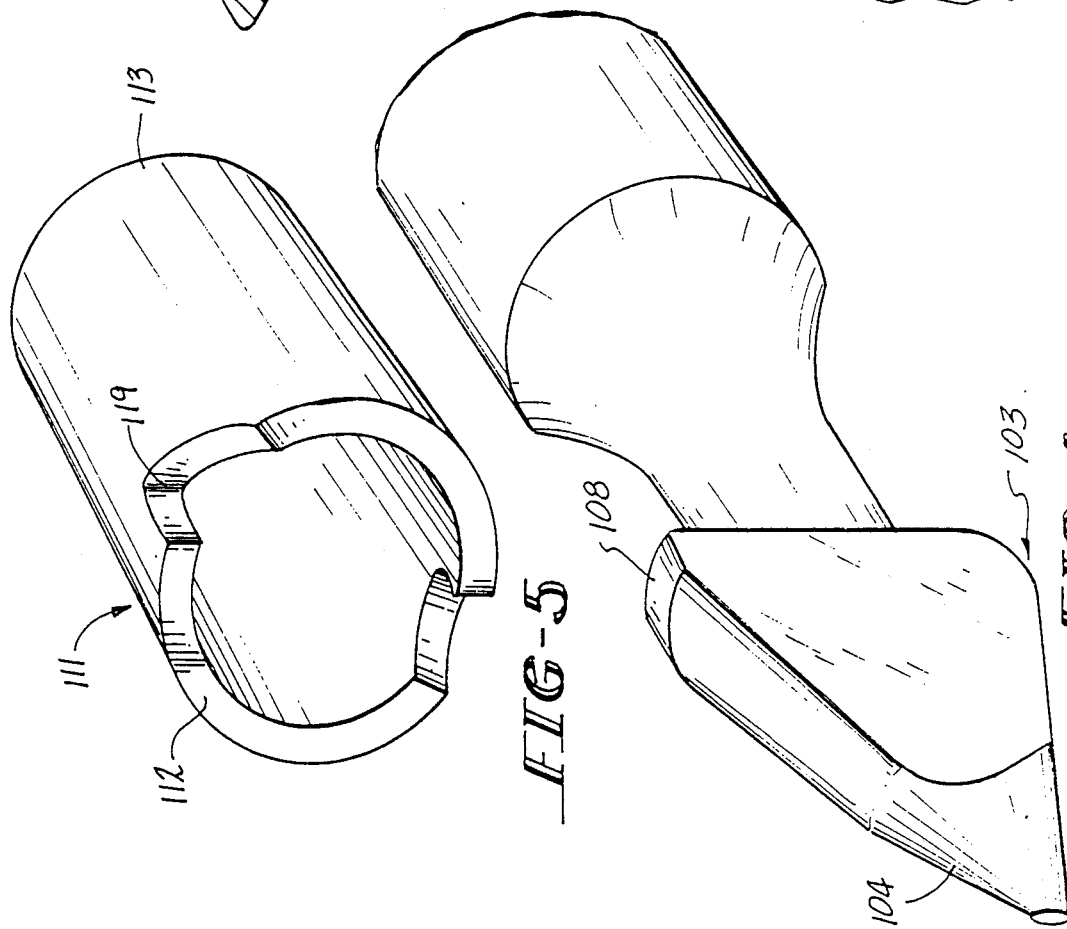

VALVE ASSEMBLY FOR INJECTION MOLDING MACHINE

BACKGROUND OF THE INVENTION

Injection molding machines with respect to which the present invention pertains generally include an elongated feed screw which rotates and reciprocates in the cylindrical bore of an elongated barrel for creating and moving molten plastic material from an inlet end to an outlet end where it is injected from a nozzle to a mold cavity. The flow of plastic material from the feed screw is normally controlled by a check valve assembly. Ring-type check valve assemblies to prevent backflow of the liquid resin during injection are well known, as for example, in U.S. Pat. Nos. 3,438,393, 3,501,810, 3,590,439, 4,105,147, 4,377,180, 4,477,242 and 4,643,665.

In accordance with the prior art, the valve is closed immediately prior to injection; however, the art requires that start of the injection action causes an initial backflow of resin to push the sliding ring of the check valve to a closed position and hence to stop the backflow. A disadvantage of this procedure is that each time a variable amount of backflow actually takes place before the valve closes and injection proper can start. Also, it is an inherent disadvantage of this method that a precise measurement of the shot to be injected cannot be made.

For example, the '439 and '147 patents listed above disclose means to prevent the rotation of the ring in order to reduce its wear at the sealing surfaces; however, they continue to use backflow to close the valve.

It is, therefore, an object of the present invention to provide a check valve assembly for an injection molding machine for controlling the flow of plastic material from a feed screw which prevents backflow of the resin.

It is a further objective of the present invention to provide an assembly as aforesaid which does not rely on the start of the injection action to close the check valve assembly.

Still further objectives of the present invention is to provide an assembly as aforesaid which enables a precise measurement of the injection shot and which is simple and convenient to use.

Further objects and advantages of the present invention will appear hereinbelow.

SUMMARY OF THE INVENTION

The foregoing objects and advantages may be readily obtained in accordance with the present invention. The improved check valve assembly for an injection molding machine of the present invention comprises: a cylindrical barrel; a rotating and reciprocating plasticizing feed screw in said barrel; a screw tip downstream of said feed screw and connected thereto, wherein said feed screw feeds heated thermoplastic material to said screw tip; a check valve assembly between said feed screw and screw tip comprising a sliding ring inside said barrel and slidable therein, a first sealing surface of said ring sealable against said feed screw and operative to block communication between the feed screw and screw tip; and means operative to seal said ring against said feed screw upon rotation of the feed screw in one direction. A second sealing surface of said ring is sealable against said screw tip upon rotation of said screw tip in a direction opposed to said one direction and is operative to block forward movement of said ring.

In a first embodiment, means operative to seal the ring respectively against the feed screw and the screw tip includes at least two balls disposed between and contacting the screw tip and ring and operative to urge the ring rearwardly to seal the ring against the feed screw upon rotation of the feed screw in one direction, and to urge the ring forward upon rotation of the feed screw in the opposite direction. The balls move in spiral grooves and three balls are preferably provided.

In a second embodiment the means operative to seal the ring against the screw tip includes a profiled cam on the screw tip engaging a cam surface on the ring and operative to urge the ring rearwardly to seal the ring against the feed screw upon rotation of the feed screw in one direction. Rotation of the feed screw in the opposite direction frees the ring for forward movement by forward feeding of the resin.

Thus, in accordance with the present invention the valve assembly is caused to shut and be sealed completely by rotating the feed screw rather than by advancing the screw towards the nozzle. The valve is therefore completely closed in a simple and convenient operation without any backflow occurring. The volume of resin injected can be very accurately controlled since none is lost by backflow across the valve.

Further features of the present invention will appear hereinafter.

BRIEF DESCRIPTION OF THE DRAWINGS

The present invention will be illustrated by the accompanying drawings, wherein:

FIG. 4 is a perspective view of the screw tip in a second embodiment of the present invention;

FIG. 5 is a perspective view of the slide ring in the embodiment of FIG. 4;

FIGS. 6–7 are schematic views of the embodiment of FIG. 4 showing the valve assembly closed and opened, respectively.

DETAILED DESCRIPTION

Figure 1:
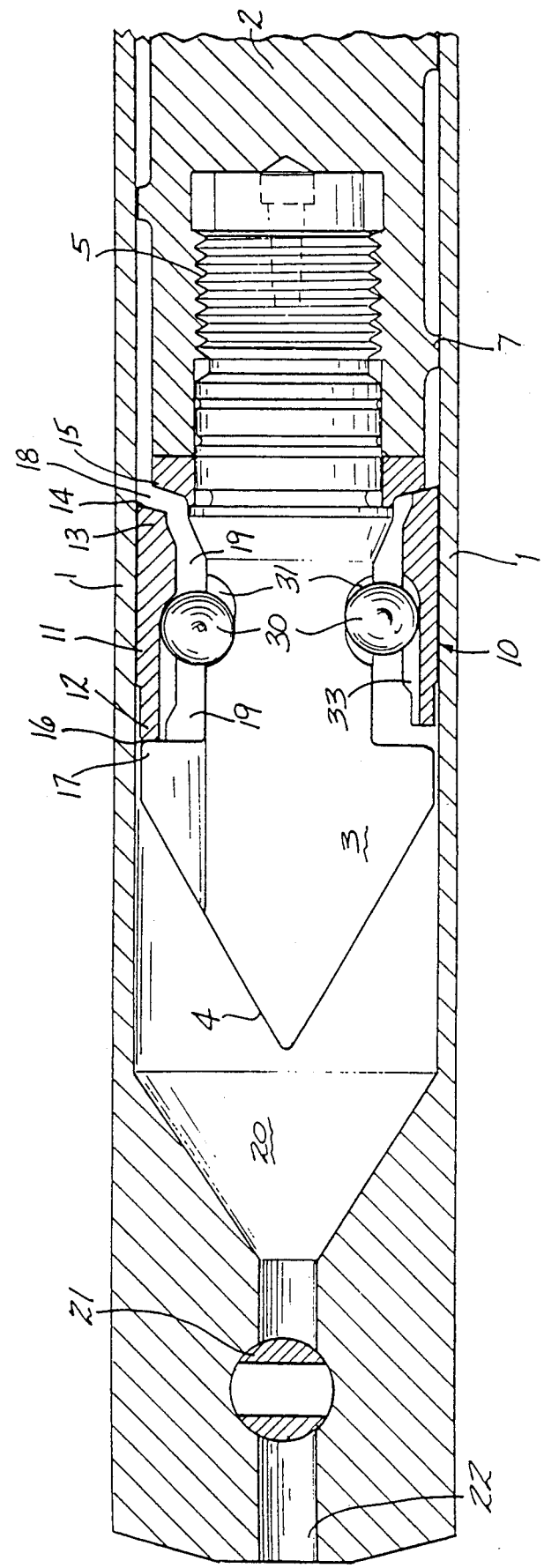
FIG. 1 is a sectional view of one embodiment of the present invention with the upper half showing the valve assembly in the open position, and the lower half showing the valve assembly in the closed position.
Figure 2:
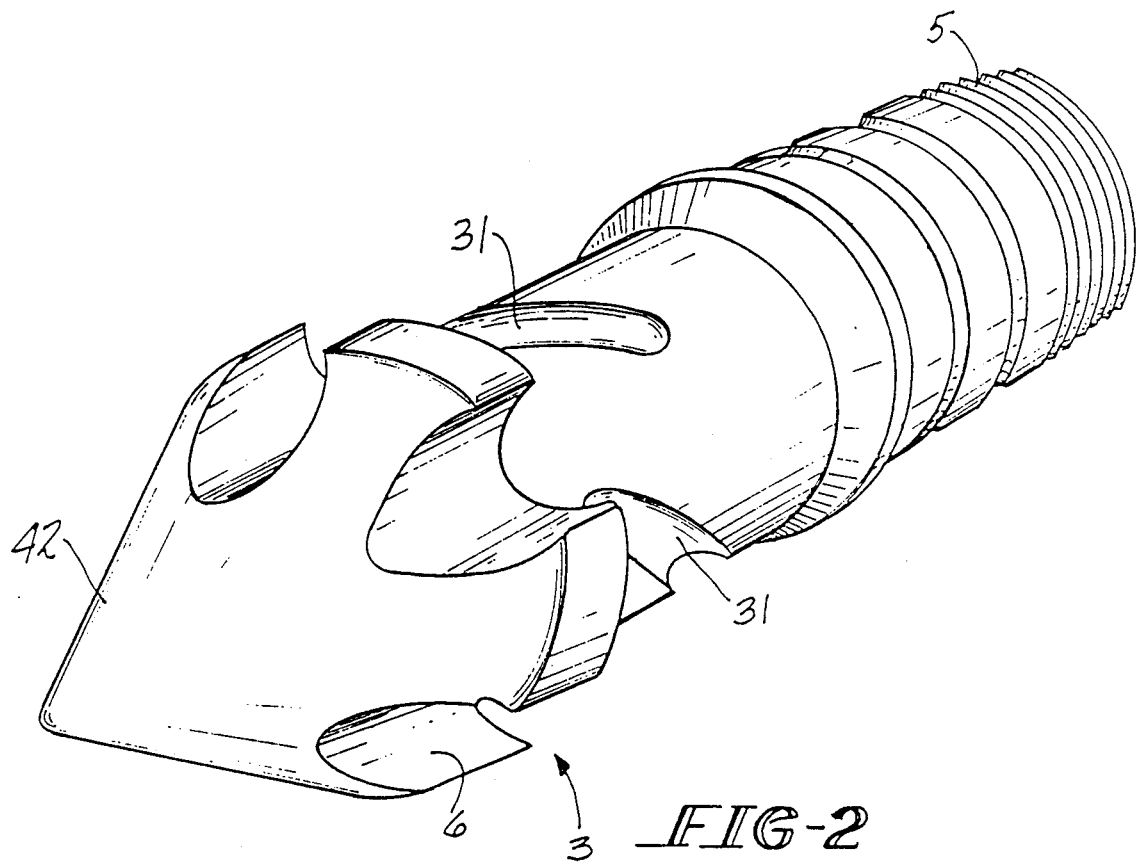
FIG. 2 is a perspective view of the screw tip.
Figure 3:
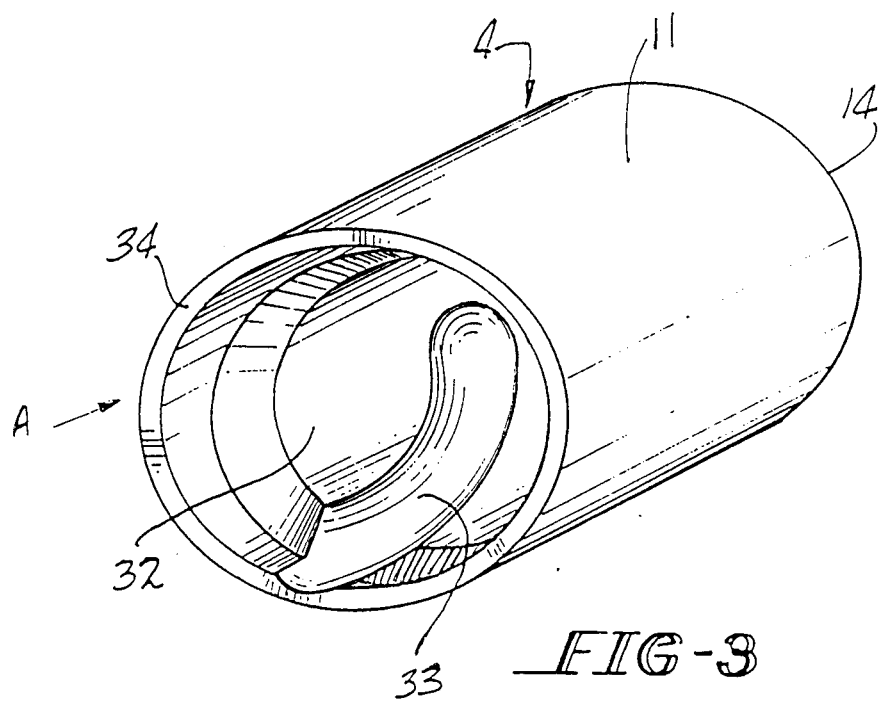
FIG. 3 is a perspective view of the slide ring.

Referring to FIGS. 1–3, cylindrical extruder barrel 1 encloses a plasticizing feed screw 2 which rotates and reciprocates inside the barrel. Screw tip 3 is disposed inside the barrel and downstream of the feed screw. The screw tip has a sharpened cone-like forward portion 4 and a threaded rear portion 5 which is locked into the end of the feed screw 2. The cone-like forward portion also includes a plurality of cut-out portions or passageways 6.

Check valve ring 10 is disposed between the feed screw 2 and screw tip 3 and includes a sliding ring 11 inside barrel 1 and is slidable therein. Ring 11 includes a forward portion 12 towards the screw tip forward portion 4 and a rearward portion 13 towards the feed screw 2, with the rearward portion 13 including a first sealing surface 14 which mates with and seals against a corresponding sealing surface 15 on the end of feed screw 2. Ring 11 also includes a second surface 16 on the forward portion 12 which mates with and against a corresponding surface 17 on the screw tip. Thus, the ring 11 is limited in its travel in the forward direction by screw tip 3 which is threaded at 5 and locked into the end of feed screw 2.

When ring 11 is fully forward (to the left) as shown in the upper half of FIG. 1, check valve passageway 18 is open and plasticized resin can flow from feed screw 2 via the feeding action of the screw through feed passageway 18 and passageway 19 between screw tip 3 and ring 11, through cut-outs 6 and into chamber 20 downstream of screw tip 3. Rotary valve 21, or any other desired means, may be used to block outlet channel 22. When ring 11 is fully rearward (to the right) as shown in the lower half of FIG. 1, check valve passageway 18 is closed and passage of resin from the feed screw 2 is blocked. After closing passageway 18, valve 21 is opened, feed screw 2 is advanced from right to left and the resin in chamber 20 is displaced into outlet channel 22 and into the mold (not shown). Naturally, in some cases an open nozzle can be used, i.e., no blocking means downstream of the screw tip.

In accordance with the embodiment of FIGS. 1-3, at least two (2) balls 30 are disposed between ring 11 and screw tip 3 in contacting relationship with both. Preferably three (3) of said balls are disposed circumferentially around screw tip 3. The balls 30 run in spiral grooves 31 on screw tip 3 and act in a similar fashion to a Bendix gear drive causing ring 11 to move rearward (to the right) when feed screw 2 is turned in a reverse direction, and causing ring 11 to move forward (to the left) when the feed screw is turned clockwise until the ring stops against screw tip surface 17.

Each ball 30 runs in its own spiral grooves 31 and 33, preferably having a helix angle in the order of 17–20 degrees and the spiral being in the same direction as screw flights 7 on feed screw 2. On the inner surface 32 of ring 11 are spiral grooves 33 which compliment spiral grooves 31. The grooves 33 permit assembly of the balls between screw tip 3 and ring 11 and therefore run to the forward end 34 of ring 11.

The mode of operation is to plasticize the resin in a normal way, then when injection is required first reverse the direction of screw 2 for a few turns only. This action causes balls 30 to drive ring 11 rearward (to the right) and close the valve. After this, the screw 2 is advanced forward (to the left) to inject normally. This means that no backflow occurs over the valve and consequently a very accurate shot control can be maintained for each shot injected.

FIGS. 4–7 show an alternate embodiment of the present invention. Screw tip 103 includes a sharpened, cone-like forward portion 104 and is locked into a feed screw in a similar manner to FIG. 1. Similarly, check valve ring 110 includes sliding ring 111 disposed inside the barrel 100 as in FIG. 1 and includes a forward portion 112 and a rearward portion 113 which seal against the screw tip and feed screw, respectively, as in FIG. 11.

However, screw tip 103 is provided with a profiled cam 108 which engages cam surface 119 on sliding ring 111. Thus, profiled cam 108 rotates along slide ring cam surface 119. As shown in FIG. 6, when cam 108 fully engages cam surface 119, slide ring 111 is fully forward allowing free flow of plastic through the valve passageway 118. Hence, rotation of the feed screw in the embodiment of FIGS. 4–7 will cause rearward motion of sliding ring 111 and will block passageway 118. FIG. 7 shows check valve passageway 118 open. The opening of passageway 118 is achieved by reverse rotation of the feed screw and forward feeding of the resin.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Injection apparatus comprising a cylindrical barrel; a rotatable and reciprocatable plasticizing feed screw in said barrel; a screw tip downstream of the feed screw and connected thereto and an outlet channel downstream of the screw tip, wherein said feed screw feeds heated thermoplastic material through said outlet channel upon reciprocation of the feed screw; a check valve assembly between said feed screw and screw tip comprising a sliding ring inside said barrel and slidable therein, a first sealing surface of said ring sealable against said feed screw and operative to block communication between the feed screw and screw tip; and means operative to seal the first sealing surface of said ring against said feed screw before reciprocation of the feed screw and upon rotation of the feed screw in one direction.

2. Apparatus according to claim 1 including an outlet channel downstream of said screw tip.

3. Apparatus according to claim 1 including a second surface of said ring sealable against said screw tip to block forward movement of said ring.

4. Apparatus according to claim 3 including at least two balls between said screw tip and ring contacting said screw tip and ring operative to urge said ring into engagement with said feed screw upon rotation of said feed screw in one direction and operative to urge said ring into engagement with said screw tip upon reverse rotation of said feed screw.

5. Injection apparatus, comprising a cylindrical barrel; a rotatable and reciprocatable plasticizing feed screw in said barrel; a screw tip downstream of the feed screw and connected thereto, wherein said feed screw feeds heated thermoplastic material to said screw tip; a check valve assembly between said feed screw and screw tip comprising a sliding ring inside said barrel and slidable therein, a first sealing surface of said ring sealable against said feed screw and operative to block communication between the feed screw and screw tip; means operative to seal said ring against said feed screw upon rotation of the feed screw in one direction; and a profiled cam on said screw tip engagable with a cam surface on said ring operative to urge said ring into engagement with said feed screw upon rotation of said feed screw in one direction and operative to free and said ring for movement into engagement with said screw tip upon reverse rotation of said feed screw.

6. Injection apparatus, comprising a cylindrical barrel; a rotatable and reciprocatable plasticizing feed screw in said barrel; a screw tip downstream of the feed screw and connected thereto, wherein said feed screw feeds heated thermoplastic material to said screw tip; a check valve assembly between said feed screw and screw tip comprising a sliding ring inside said barrel and slidable therein, a first sealing surface of said ring sealable against said feed screw and operative to block communication between the feed screw and screw tip; means operative to seal said ring against said feed screw upon rotation of the feed screw in one direction; and a second surface of said ring sealable against said screw tip to block forward movement of said ring; and at least three balls between said screw tip and ring contacting said screw tip and ring operative to urge said ring into engagement with said feed screw upon rotation of said feed screw in one direction and operative to urge said ring into engagement with said screw tip upon reverse rotation of said feed screw, said balls being circumferentially disposed around said screw tip with each ball running in its own spiral groove.

7. Injection apparatus, comprising a cylindrical barrel; a rotatable and reciprocatable plasticizing feed screw in said barrel; a screw tip downstream of the feed screw and connected thereto, wherein said feed screw feeds heated thermoplastic material to said screw tip; a check valve assembly between said feed screw and screw tip comprising a sliding ring inside said barrel and slidable therein, a first sealing surface of said ring sealable against said feed screw and operative to block communication between the feed screw and screw tip; means operative to seal said ring against said feed screw upon rotation of the feed screw in one direction; and a passageway disposed between said ring and said screw tip communicating with a feed passageway adjacent the first sealing surface of said ring, wherein said ring is slidable against said feed screw to block said communication.

8. Apparatus according to claim 7 including a feed chamber downstream of said passageway and communicating therewith.

9. Injection apparatus, comprising a cylindrical barrel; a rotatable reciprocatable plasticizing feed screw in said barrel; a screw tip downstream of the feed screw and connected thereto, wherein said feed screw feeds heated thermoplastic material to said screw tip; a check valve assembly between said feed screw and screw tip comprising a sliding ring inside said barrel and slidable therein, a first sealing surface of said ring sealable against said feed screw and operative to block communication between the feed screw and screw tip; means operative to seal said ring against said feed screw upon rotation of the feed screw in one direction; and a second surface of said ring sealable against said screw tip to block forward movement of said ring; at least two balls between said screw tip and ring contacting said screw tip and ring operative to urge said ring into engagement with said feed screw upon rotation of said feed screw in one direction and operative to urge said feed screw into engagement with said screw tip upon reverse rotation of said feed screw; and an open groove inside said ring to permit assembly of said screw tip, ring and balls.

* * * * *